United States Patent [19]

Kester et al.

[11] Patent Number: 6,001,411

[45] Date of Patent: *Dec. 14, 1999

[54] STORAGE STABLE PAR-FRIES HAVING REDUCED LEVELS OF PYRAZINE

[75] Inventors: Jeffrey John Kester, West Chester, Ohio; Michael Robert Sevenants, Newport, Ky.; David Alan Volker, North Bend, Ohio

[73] Assignee: The Procter & Gamble Co., Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/960,414

[22] Filed: Oct. 29, 1997

[51] Int. Cl.$^6$ .................................................. A23L 1/216
[52] U.S. Cl. .......................... 426/637; 426/438; 426/321; 426/654
[58] Field of Search ...................... 426/637, 438, 426/321, 654

[56] References Cited

U.S. PATENT DOCUMENTS

| | | | |
|---|---|---|---|
| 3,865,964 | 2/1975 | Kellermeier | 426/307 |
| 3,968,265 | 7/1976 | Shatila | 426/550 |
| 4,109,020 | 8/1978 | Gorfien | 426/241 |
| 4,167,588 | 9/1979 | Willard | 426/283 |
| 4,219,575 | 8/1980 | Saunders | 426/242 |
| 4,317,842 | 3/1982 | El-Hag et al. | 426/302 |
| 4,447,459 | 5/1984 | Balboni et al. | 426/441 |
| 4,456,624 | 6/1984 | Glantz | 426/96 |
| 4,542,030 | 9/1985 | Haury | 426/262 |
| 4,551,340 | 11/1985 | El-Hag | 426/437 |
| 4,579,743 | 4/1986 | Hullah | 426/262 |
| 4,590,080 | 5/1986 | Pinegar | 426/441 |
| 4,698,230 | 10/1987 | Willard | 426/533 |
| 4,900,576 | 2/1990 | Bonnett | 426/438 |
| 4,931,296 | 6/1990 | Shanbhag | 426/243 |
| 5,000,970 | 3/1991 | Shanbhag | 426/296 |
| 5,104,678 | 4/1992 | Yang | 426/601 |
| 5,242,699 | 9/1993 | Bednar | 426/302 |
| 5,279,840 | 1/1994 | Baisier | 426/102 |
| 5,302,410 | 4/1994 | Calder | 426/637 |
| 5,308,640 | 5/1994 | Baer | 426/611 |
| 5,648,110 | 7/1997 | Wu | 426/102 |
| 5,753,291 | 5/1998 | Penderson | 426/441 |

FOREIGN PATENT DOCUMENTS

| | | |
|---|---|---|
| 0 026 565 | 1/1980 | European Pat. Off. . |
| 0 342 059 | 12/1989 | European Pat. Off. . |
| 38 14587 A1 | 4/1988 | Germany . |
| 1 579 392 | 3/1977 | United Kingdom . |
| 2 078 081 | 1/1981 | United Kingdom . |
| WO 91/00023 | 1/1991 | WIPO . |
| WO 91/15964 | 10/1991 | WIPO . |
| WO 94/05165 | 3/1994 | WIPO . |

*Primary Examiner*—Nina Bhat
*Attorney, Agent, or Firm*—Jay A. Krebs; Larry L. Huston; Donald E. Hasse

[57] ABSTRACT

A method for preparing frozen par-fried potato strips comprising about 32% to about 52% moisture which remain fresh tasting after storage at about 0° F. (−17.8° C.). The method comprises peeling, trimming and cutting raw potatoes into strips, blanching, and reducing the moisture content of the potato strips to not less than about 54% followed by, par-frying the potato strips in oil for a time sufficient to reduce the moisture of the potato strips to a final moisture content of from about 32% to about 52%. Thereafter, the par-fried potato strips are frozen. The frozen par-fried potato strips have reduced levels of 2,5-dimethyl pyrazine and relatively high levels of 2,4-decandienal. When cooked, the finished French fries have improved flavor over conventional oven baked fries.

25 Claims, No Drawings

STORAGE STABLE PAR-FRIES HAVING REDUCED LEVELS OF PYRAZINE

TECHNICAL FIELD

The present invention relates to frozen par-fried potato strips comprising from about 32% to about 52% moisture which remain fresh tasting after frozen storage. More particularly this invention relates to par-fried potato strips for subsequent reconstitution in an oven prior to consumption. The finished fries have substantially the same texture and flavor as deep fried French fries. Further, the finished fries show a vast improvement in flavor when compared to commercially prepared par-fries which have been oven finished.

BACKGROUND OF THE INVENTION

French fries are one of the most popular convenience foods. A wide variety of French fried potato products are produced for both foodservice and home use. French fried potato strips, commonly referred to as "French fries" are served in most fast food restaurants. Most restaurants including large restaurants and consumers prefer to prepare the French fries from the frozen or chilled partially fried product (hereinafter par-fried) rather than go through the procedure of preparing French fries from raw potatoes. The par-fried potatoes are converted by the fast food restaurant or consumer into products such as French fried potatoes and the like.

The use of par-fried potato strips has been widely adopted in fast food restaurants because of the advantages they offer. A few of the recognized advantages associated with the use of chilled and frozen par-fried potato strips are, for example, users know the exact cost, the number of servings and the cost per portion. In addition, use of the frozen par-fried potatoes simplifies storage and inventory control, assures uniform quality from one season to another and reduces labor and preparation time for serving.

Commercial par-fried potato products are often shipped over long distances and generally must be stored for extended periods of time in the frozen state at about 0° F. (−17.8° C.) prior to ultimate purchase by the consumer. The potato strips are partially fried, then frozen or chilled and packaged. The packaged par-fries are shipped to restaurants, groceries, or ultimate consumers. During shipping and storage and until they are prepared, the products are refrigerated (i.e. held in a chilled state at cold storage temperatures of about 35° F. to about 45° F. (1 .7° C. to about 7.2° C.) in a frozen state at temperatures below 32° F. (0° C.). Prior to consumption, the chilled or frozen par-fried potato strips are reconstituted (e.g., by finish frying in oil, baking, microwaving) to produce ready-to-eat French fries.

Typically par-fried potato strips that are intended to be finished by cooking are relatively high in moisture content (e.g., about 60% to 70% moisture). When these par-fries are finished by baking in an oven, the bake time is relatively long (e.g., ≧10 minutes) and the finished fries are generally limp and soggy and do not have a crisp crust. To shorten the baking time and improve the surface texture, the par-fries can be fried to lower moisture contents (e.g. <60% $H_2O$). However, this presents another problem in that when frozen par-fried potato strips that comprise less than about 53% moisture are stored at temperatures between about 0° F. (−17.8° C.) to about 30° F. (−1.1° C.), they tend to develop undesirable off-flavors during storage. The off-flavor may be described as "stale" and/or "cardboard". Although this development of off-flavor may not be noticeable when the par-fries are finished by a deep-fry process, it is very noticeable when the fries are oven-finished.

It is believed that the components responsible for the off-flavors volatilize during the frying process and that any off-flavors in the French fries are masked and/or diluted by the uptake of conditioned oil from the frying kettle. However, in the frozen par-fried potato strips that are finish cooked by an oven baking process, the stale or cardboard off-flavor is not voltailized, masked or diluted and therefore, the stale or cardboard flavor is quite noticeable.

Therefore, it can be seen that providing storage stable par-fries, comprising less than about 53% moisture, that retain good flavor when baked in an oven is a difficult task.

Accordingly, it is an object of the present invention to provide frozen par-fried potato strips which are flavor stable during frozen storage.

It is another objective of the present invention to provide chilled or frozen par-fried potato strips which remain fresh tasting upon cooking, particularly oven baking, after frozen storage.

It is a further object of the present invention to provide frozen par-fried potato strips, which when finished, will have substantially the same lubriciousness and textural attributes of French fried potato strips that have been finished by deep frying.

SUMMARY OF THE INVENTION

In accordance with the present invention, par-fried potato strips that are flavor stable are provided. The par-fried potato strips comprise:

(a) from about 32% to about 52% moisture; and (b) less than about 0.6 ppm 2,5-dimethyl pyrazine.

In accordance with another aspect of the present invention, the par-fried potato strips have moderate to high levels of a flavor component often associated with "fried flavor"; 2,4 decadienal.

In accordance with still another aspect of the present invention, the par-fried potato strips contain moderate to high levels of fat expressed on a dry potato solids basis, which provides desirable lubricity or oiliness in the oven-finished fry.

In yet another aspect of the present invention is provided a process for preparing the par-fries of the present invention.

DETAILED DESCRIPTION

Definitions

As used herein the terms "par-fry", "par-fries" or "par-fried potato strips" refer to potato strips that have been subjected to at least one frying process (e.g., deep frying), but which have not been completely cooked.

As used herein the term "storage stable" refers to par-fried potato strips that develop little or no stale or cardboard off-flavor during storage at about 0° F. (−17.8° C.) to about 30° F. (−1.1° C.) for at least 1 month.

As used herein the term "frozen storage" refers to storage at temperatures of from about 0° F. (−17.8° C.) to about 30° F. (−1.1° C.).

As used herein "cooked" refers to a procedure wherein food products are treated with heat prior to their consumption, such as, for example, by frying, baking, broiling, microwaving, heating in a toaster or toaster oven, etc. Typically, cooking entails reducing the moisture content of the food.

As used herein the term "fat" or "oil" refers to edible fatty substances in a general sense, including natural or synthetic fats and oils consisting essentially of triglycerides, such as, for example soybean oil, corn oil, cottonseed oil, canola oil, sunflower oil, palm oil, coconut oil, fish oil, lard and tallow, which may have been partially or completely hydrogenated or modified otherwise, as well as non-toxic fatty materials having properties similar to triglycerides, herein referred to as fat-substitutes, which materials may be partially or fully indigestible. The terms "fat" and "oil" are used interchangeably.

As used herein the term "conditioned oil" refers to oil which has been previously used for frying for such a time that it has developed fried flavor.

As used herein the term "finished" refers to a product that has been subjected to a finishing process to convert it to a ready-to-eat form. Obviously, the advantages of the invention cannot be realized until the par-fry is cooked, for example, by baking in an oven such as a forced air convection oven, a hot air impingement oven, a combination of infrared radiation and convection oven, a toaster, toaster oven, a double impingement oven, a combined microwave and convection oven, a conventional home oven or by cooking in a microwave oven.

Unless otherwise stated, all percentages, ratios or proportions expressed herein are by weight.

An aspect of the present invention is based on the discovery that as the moisture of par-fries is reduced to below about 53%, off-flavors develop in the par-fries during chilled/frozen storage. Although off-flavors in par-fries may develop from a variety of causes, it is believed that products of the browning reactions that occur during frying (e.g. Maillard reaction, Strecker degradation reaction) can contribute to development of stale/cardboard off-flavors during frozen storage of par-fries. Surprisingly, it has been found that low-moisture (e.g., below about 53%) par-fries having reduced levels of pyrazines exhibit significantly better flavor stability during frozen storage (i.e., less stale or cardboard off-flavor development) than conventionally processed par-fries. The par-fries may be finished by various oven-finishing processes. The finishing processes in which the present invention is best realized, include for example, baking in an oven such as a forced air convection oven, a hot air impingement oven, a double impingement oven, a combination of infrared radiation and convection oven, a toaster, toaster oven, a combined microwave and convection oven, a conventional home oven or by cooking in a microwave oven.

PAR-FRIES

The present invention relates to frozen, storage-stable, partially-fried potato products. More specifically, the present invention relates to partially fried potato strips (hereinafter par-fries). The par-fries of the present invention are resistant to the development of stale, cardboard off-flavors that occur during extended storage at temperatures between about 0° F. (−17.8° C.) and about 30° F. (−1.1° C.). The par-fries comprise from about 32% to about 52% moisture and less than about 0.6 ppm 2,5 dimethyl pyrazine. Preferably, the par-fries of the present invention comprise at least about 0.5 ppm of 2,4 decadienal. In another preferred embodiment, the par-fries of the present invention comprise at least about 0.35 gram fat/gram potato solids.

Moisture Content

The par-fries of the present invention have a moisture content that is lower than conventionally produced par-fries. The low moisture content of the par-fries enables the preparer to finish the par-fries of the present invention in a conventional oven (e.g., home oven) in less than about 15 minutes, and in a commercial oven (e.g., forced air oven, impingement oven, microwave oven) in less than about 3 minutes.

The par-fries of the present invention have a moisture content of from about 32% to about 52%, preferably from about 34% to about 50%, more preferably from about 36% to about 48%, even more preferably from about 38% to about 46%, and most preferably from about 40% to about 44%.

2.5-dimethyl pyrazine

An important attribute of the low moisture par-fries of the present invention is the presence of low levels of 2,5-dimethyl pyrazine. While the exact mechanism is not known, it has been found that low moisture par-fries comprising low levels of this component are resistant to the development of stale/cardboard off-flavors during frozen storage. While not wishing to be bound by theory, it is believed that 2,5-dimethyl pyrazine is a marker for the susceptibility of the par-fry to off-flavor formation during frozen storage. The 2,5-dimethyl pyrazine is formed as a result of the browning/Strecker degradation reactions that occur during frying. It is believed that one or more products of the browning and/or Strecker degradation reactions is contributing to development of stale/cardboard off-flavors durin g frozen storage of par-fries.

The par-fries of the present invention comprise less than about 0.60 ppm 2,5-dimethyl pyrazine, preferably less than about 0.50 ppm, more preferably less than about 0.45 ppm, even more preferably less than about 0.40 ppm, even more preferably less than 0.35 ppm, and most preferably less than 0.30 ppm (as measured by simultaneous distillation-extraction). The method for determining the amount of 2,5-dimethyl pyrazine is described in the Analytical Methods hereinbelow.

2.4-decadienal

The par-fries of the present invention, preferably comprise 2,4-decadienal. The presence of 2,4-decadienal contributes positive fried flavor. The par-fries of the present invention preferably comprise at least about 0.5 ppm 2,4-decadienal, more preferably at least about 0.6 ppm, even more preferably at least about 0.8 ppm, even more preferably between about 1.0 and 5.0 ppm, and most preferably between about 1.5 and 3.0 ppm 2,4-decadienal. The method for determining the amount of 2,4-decadienal is described in the Analytical Methods hereinbelow.

Fat

The par-fries of the present invention also comprise preferred levels of fat. The fat present in the par-fries of the present invention is substantially the same as the fat used for frying the raw potato strips. The fat typically present in the par-fries is described in the section entitled "Par-frying Oils" herein below.

The fat of the par-fries of the present invention can be expressed on a dry potato solids basis. In order to improve lubriciousness, the par-fries of the present invention preferably comprise more than 0.35, gram of fat/gram potato solid. More preferably, the par-fries contain greater than about 0.38, even more preferably greater than about 0.40, and most preferably greater than about 0.42 gram of fat/gram potato solid.

PAR-FRY PROCESSING

The par-fries of the present invention may be prepared by various methods which will result in par-fries comprising relatively low levels of 2,5-dimethyl pyrazine. It has been found that the amount of this component present in the par-fries may be controlled during the par-frying step. This is because the Maillard and Strecker degradation browning reactions occur primarily during the par-frying process. Finished par-fries that are resistant to development of off-flavors during frozen storage can be produced by controlling the degree of browning that occurs during par-frying and/or by significantly lowering the amount of reducing sugar and amino acid reactants in the raw potatoes.

Potato Preparation

In accordance with the present invention, raw unpeeled white potatoes are obtained for processing. Any variety of potatoes is acceptable, for instance Garnet Chili, Early Rose, Russet Rural, Peach Blow, Early Ohio, Triumph, Kennebec, Merrimack, Delus, Saco, Katahdin, Bounty, Cherokee, Chippewa, Early Gem, Haig, Irish Cobbler, La Rough, Norgold Russet, Norland, Onaway, Pungo, Re La Sorda, Red McGlure, Red Pontiac, Russet Burbank, Russet Sebago, Sebago Superior, Shepody, Viking or White Rose. However, it is preferred to use Russet Burbank or Katahdin potatoes in the practice of this invention to obtain the best combination of internal texture and flavor in the final French fry product. It should be noted that the quality of French fries will vary with the potato used. This variance will occur both between different species of potatoes and the age of the potato within a given species.

The potatoes are washed, peeled, trimmed, sorted, and are cut into strips of a desired size and shape customarily used for French fries. Potatoes may be cut into spiral cut, crinkle-cut and straight cut strips such as shoestring potato strips and thick strips.

In the practice of the present invention it is preferred that the potato strips known in the art as "shoestrings" be used herein. Shoestring potato strips, as used herein refer to potato strips that are from about 3/16 to about 5/16 inch square and from about 2.5 to about 5 inches in length.

Other potato strips which may be used herein are known in the art as "crinkle cut" strips. Such strips usually average from about 5/16 to about 1/2 inch and from about 2 to about 4 inches in length.

Also, straight cut thick potato strips (known as "regular-cut") of from about 5/16 to about 1/2 inch square and about 2.5 to about 5 inches in length may be used. Larger potato strips of the type referred to as "steak fries" may also be used. Typically, these potato strips have a rectangular cross-section of about 1/2 inch by about 7/8 inch. After cutting, the strips may be washed to remove surface starch.

The potato strips are blanched according to conventional procedures known in the art. This is done to inactivate enzymes and remove excess free sugars from the surfaces of the cut strips. Typically the strips are blanched by immersion in hot water at a temperature of about 140° F. (60° C.) to about 200° F. (93.3° C.) for about 3 to about 20 minutes depending upon strip size. Alternatively, the strips may be blanched in steam, at atmospheric pressure for about 2 to about 10 minutes.

Following the blanching step, the potato strips can be immersed in water to significantly lower the level of reducing sugar. It is believed that in this approach the browning reactants or precursors contributing to off-flavor development are leached from the potato strips. The potato strips can be leached or the potato strips can be leached and treated according to conventional methods known in the art. For instance, the potato strips may be subjected to additional water immersion steps to further leach excess sugars and the strips may be treated with sodium acid pyrophosphate (SAPP), a chelating agent used to prevent discoloration of the strips.

The potato strips can also be subjected to a dehydration procedure which reduces the moisture of the par-fries to a moisture content of about 54% prior to par-frying. Any of the conventional dehydration procedures used in the production of par-fried potato strips may be used, for example, subjecting the potato strips to heated air at temperatures of from about 150° F. (65.6° C.) to about 350° F. (I76.7° C.) for from about 5 to about 20 minutes. Optionally, the potato strips may be dehydrated by heating in a forced air convection oven or an impingement oven or by heating in a combination microwave/forced air convection oven. Microwave or radio-frequency drying may also used.

Dehydration may also be accomplished by other methods known in the art used to produce conventional par-fries, e.g., frying at temperatures of from 300° F. (148.9° C.) to 390° F. (198.9° C.). During dehydration of the strips the moisture content of the potato strip is reduced to a level not less than about 54%. Any combination of the above listed dehydration processes may be used; e.g., partial drying of potato strips with hot air followed by par-frying of the strips in oil at a temperature of about 365° F. (185° C.) to yield par-fried potato strips comprising about 54% moisture. Each of these steps are well known in the art and discussed in detail in the Potato Processing, published in 1975 by the A.V.I. Publishing Co., Inc., Westport, Conn., and edited by W. F. Talbert and O. Smith.

The dehydrated potato strips comprising about 54% moisture may be subjected immediately to the par-frying step or may be cooled or chilled or frozen prior to par-frying. Methods for chilling and/or freezing potato strips are well known in the art. The time required to achieve the desired degree of chilling or freezing Awill vary depending on factors such as the temperature of the refrigerant, the size of the potato strips, the type of refrigerant used and other factors which can easily determined by those skilled in the art.

Par-frying

After blanching, and if desired the optional treatments described above, the blanched or dehydrated potato strips are subjected to a par-frying step. Various par-frying processes may be used to produce par-fries of the present invention.

One method of par-frying is low temperature frying. In this method the raw, blanched, or dehydrated potato strips are totally immersed in hot oil at a temperature of from about 270° F. to about 335° F. (132° C. to about 168° C.) for a time sufficient to reduce the moisture of the potato strips to a final moisture content of from about 32% to about 52%. Preferably, this frying step is conducted at an oil temperature of about 280° F. to about 320° F. (138° C. to about 160° C.), most preferably at about 290° F. to about 310° F. (143° C. to about 154° C.). Any variety of edible fats and oils may be used to par-fry the potato strips.

Another par-frying process that can be used to prepare the par-fries of the present invention is the deluge process. In this process a heated oil having a temperature of from about 270° F. (132° C.) to about 335° F. (168° C.) is sprayed onto the potato strips and surrounds the potato strips for a time sufficient to reduce the moisture to the requisite moisture content. Other frying techniques such as mist frying and foam frying may also be used.

Par-frying can also be accomplished using a multiple immersion frying process wherein the potato strips are partially fried more than one time. The par-fried potato strips may be cooled, chilled or frozen between par-frying steps or par-fried in oils adjusted to different temperatures. Preferably, in the multiple immersion frying process the blanched potato strips, which may have been partially dried with hot air are fried a first time in oil having a higher oil temperature than the next frying oil. This process may be repeated multiple times (e.g., high temperature, low temperature, high temperature, low temperature, etc.) until the par-fries reach a moisture content of about 54%. The temperature of the first fryer may range from about 300° F. to about 390° F. (148.9° C. to about 198.9° C.), while the combined par-frying times may range from about 10 to about 120 seconds or for a time sufficient to reduce the moisture content of the potato strips to about 54%.

Once the par-fried potato strips reach a moisture content of about 54% the par-fried strips are once again fried in oil having a temperature ranging from about 270° F. (132° C.) to about 335° F. (168.3° C.), preferably from about 280° F. (138° C.) to about 320° F. (160° C.), and most preferably at about 290° F. (143° C.) to about 310° F. (154° C.). This may consist of single or multiple immersions in the frying oil. The par-frying time ranges from about 1 minute to about 6 minutes or a time sufficient to reduce the moisture content such that the resulting potato strips have a moisture content of about 32% to about 52%. The actual time required for any given frying step is determined by several factors; including the specific oil temperature, dimensions and temperature of the potato strips, the batch size, volume of the frying kettle, and initial moisture content of the potato strips.

The par-fries of the present invention can also be prepared by vacuum frying. This allows frying at high oil temperatures (e.g., 370° F. or higher), while resulting in par-fries having a low 2,5-dimethyl pyrazine level. In this method the blanched potato strips or dehydrated potato strips are placed in a vacuum fryer and fried at a temperature of about 250° F. to about 400° F. under a full or partial vacuum. The pressure in the vacuum fryer is less than about 400mmHg, preferably less than about 200mmHg, even more preferably less than about 100mmHg. When par-frying the fryer is continuously heated and vacuum-pumped so that the temperature and pressure within the fryer is kept within the desired range. The par-fries are fried for a time sufficient to obtain the requisite moisture content. The time is typically in the range of from about 1 to about 6 minutes.

The par-fries of the present invention comprising 32% to 52% moisture can also be prepared using commercially available par-fries comprising at least 60% moisture. It must be remembered that these commercially prepared par-fries may have been subjected to multiple processing steps (i.e., par-fry and freezing, multiple par-frying and freezing). Therefore, when using commercially prepared par-fried potato strips it is important that the par-fries have a moisture content greater than or equal to 54% prior to subsequent frying. It is also important that par-frying to reduce the moisture of the par-fries to the requisite moisture content occur in oil having a temperature of about 270° F. to about 335° F. (132° C. to about 168.3° C.) unless a method such as vacuum frying is used.

Par-frying, Oils

The edible oils used for par-frying and present in the par-fries of the present invention include natural or synthetic fats and oils. Preferably the edible fat or oil used for par-frying the potato strips has a free fatty acid level no greater than about 0.8%.

The terms "fat" and "oil" are used interchangeably herein unless otherwise specified. The terms "fat" or "oil" refer to edible fatty substances in a general sense, including natural or synthetic fats and oils consisting essentially of triglycerides which may have been partially or completely hydrogenated as well as non-toxic fatty materials having properties similar to triglycerides, herein referred to as non-digestible fats, which materials may be partially or fully indigestible. Reduced calorie fats and edible non-digestible fats, oils or fat substitutes are also included in the term. The term "non-digestible fat" refers to those edible fatty materials that are partially or totally indigestible, e.g., polyol fatty acid polyesters, such as OLEAN®.

The oils may be partially or completely hydrogenated or modified otherwise. Edible fats and oils suitable for use include but are not limited to beef tallow, lard, cottonseed oil, soybean oil, corn oil palm oil, canola oil, fish oil, safflower oil, sunflower oil, coconut oil, peanut oil, medium chain triglycerides, structured triglycerides containing a combination of short or medium chain fatty acids and long chain fatty acids (e.g. Caprenin-like) and the like or combinations thereof. If desired the oils may be conditioned or flavored, see *Flavored Vegetable Oils as a Substitute for Beef Tallow in Deep Frying Applications*, Food Technology, pp. 90–94 (1989) and U.S. Pat. No. 5,104,678 (Yang et al.).

Additionally non-toxic, fatty materials having properties similar to triglycerides such as sucrose polyesters and Olean™, from the Procter and Gamble Company, and reduced calorie fats, polyol fatty acid polyesters, and diversely esterified polyol polyesters or combinations of regular fats and fat substitutes may also be used herein.

Particularly preferred are non-digestible fats such as those described in U.S. Pat. Nos. 3,600,186 to Mattson et al., issued May 12, 1970; 4,005,195 to Jandacek, issued Jan. 25, 1977; 4,005,196 to Jandacek et al., issued Jan. 25, 1977; 4,034,083 to Mattson, issued Jul. 5, 1977; and 4,241,054 to Volpenhein et al., issued Dec. 23, 1980, all of which are incorporated by reference.

By "polyol" is meant a polyhydric alcohol containing at least 4, preferably from 4 to 11 hydroxyl groups. Polyols include s;ugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars are mannose, gailactose, arabinose, xylose, ribose, apiose, rhamnose, psicose, fructose, sorbose, tagatose, ribulose, xylulose, and erthrulose. Oligosaccharides suitable for use herein include, for example, maltose, kojibiose, nigerose, cellobiose, lactose, melibiose, gentiobiose, turanose, rutinose, trehalose, sucrose and raffinose. Polysaccharides suitable for use herein include, for example, amylose, glycogen, cellulose, chitin, inulin, agarose, zylans, mannan and galactans. Although sugar alcohols are not carbohydrates in a strict sense, the naturally occurring sugar alcohols are so closely related to the carbohydrates that they are also preferred for use herein. Natural sugar alcohols which are suitable for use herein are sorbitol, mannitol, and galactitol. Particularly preferred classes of materials suitable for use herein include the monosaccharides, the disaccharides and sugar alcohols. Preferred unesterified polyols include glucose, fructose, glycerol, alkoxylated polyglycerols, sugar ethers, and linked alkoxylated glycerines as described in U.S. Pat. No. 5,516,544 to Sekula et al., issued Jun. 14, 1996, incorporated by reference. A particularly preferred polyol is sucrose. Preferred alkoxylated glycerols are described in the following U.S. Patents, incorporated by reference herein; U.S. Pat. No. 5,273,772 to Cooper, issued Dec. 28, 1993; U.S. Pat. No. 5,288,884 to Cooper, issued Feb. 22, 1994; U.S. Pat. No. 5,298,637 to Cooper, issued Mar. 29, 1994; U.S. Pat. No. 5,362,894 to Handwerker et al., issued Nov. 8, 1994; U.S. Pat. No. 5,374,446 to Ferenz et al., issued Dec. 20, 1994; U.S. Pat. No. 5,387,429 to Cooper, issued Feb. 7, 1995; U.S. Pat. No. 5,427,815 to Ferenz, issued Jun. 27, 1995; U.S. Pat. No. 5,466,843 to Cooper, issued Nov. 14, 1995; U.S. Pat. No. 5,516,544; U.S. Pat. No. 5,589,217 to Mazurek, issued Dec. 31, 1996; and U.S. Pat.

No. 5,597,605 to Mazurek, issued Jan. 28, 1997. More preferred alkoxylated glycerines are linked alkoxylated glycerines and are described in the following patents, previously incorporated herein, U.S. Pat. Nos. 5,374,446; 5,427,815; and 5,516,544. Especially preferred alkoxylated glycerines are those described in U.S. Pat. No. 5,516,544, previously incorporated by reference.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case ol sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, (e.g., cis- or trans- isomers) and can be the same for all ester groups, or can be mixtures of different fatty acids.

Liquid non-digestible oils can also be used in the practice of the present invention. Liquid non-digestible oils which have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolyc(arboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued June 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein but provides more digestible fat than is typically preferred.

The preferred non-digestible fats are fatty materials having properties similar to triglycerides such as sucrose polyesters. OLEAN®, a preferred non-digestible fat, is made by The Procter and Gamble Company. These preferred non-digestible fats are described in Young; et al., U.S. Pat. No. 5,085,884, issued Feb. 4, 1992, and U.S. Pat. No. 5,422,131, issued Jun. 6, 1995 to Elsen et al.

Preferably the edible fat or oil used for par-frying the potato strips has a free fatty acid level no greater than about 0.8%.

Flavoring agents, such as salt, pepper, butter, onion, or garlic may be added to the oil to enhance the flavor or modify the flavor to any desired taste. One skilled in the art will readily appreciate that the aforementioned listing of flavoring agents is in no way exhaustive, but is merely suggestive of the wide range of additives which are suitable for use in the practice of the present invention.

Other ingredients known in the art may be added to the edible fats and oils used for par-frying the potato strips, including but not limited to antioxidants (e.g. tocopherols and TBHQ), chelating agents (e.g. citric acid) and anti-foaming agents (e.g. dimethylpolysiloxane).

Chilling or Freezing Par-fries

After par-frying the potato strips are chilled or frozen. Chilling or freezing of the par-fries may be accomplished by methods known in the art.

The step of contacting the refrigerant with the par-fried potato strips may be accomplished by dipping the strips in a pool of the refrigerant, or by spraying the refrigerant on them. In any case, the time of contact is limited so that preferably only the surface layers of the strips become frozen. The time required to achieve the desired degree of freezing will vary depending on such factors as the temperature of the refrigerant. the size of the potato strips etc. The freezing may either be a surface freeze or a total freeze. It is not essential that the surface freeze be accomplished by the use of a liquid refrigerant; one may use a refrigerant in a gaseous state. For example, the par-fried potato strips may be subjected to a current of cold air at a temperature below 0° F. (−17.8° C.). A convenient method is to use a conventional blast freezer or a high velocity current of air where the potato strips are subjected to a blast of cold air at a temperature of less than or equal to about −20° F. (−28.9° C.). Alternatively, the potato strips may be placed in a freezer compartment, for example, at −10° F. (−23.3° C.), of a suitable size such as a commercial or industrial unit.

The frozen par-fried potato strips are then packed into tightly sealed, i.e., airtight, packages and stored at normal freezer temperatures of from about −20° F. (−28.9° C.) to about 10° F. (−12.2° C.). The containers may contain a large amount of the potato strips, i.e. a few pounds, or may be designed to hold a suitable serving size.

Additional steps may be practiced within the process of the invention without departing from the spirit and scope of the invention. For instance the par-fries may be treated by methods known in the art, for example, coated with a film forming hydrocolloid, starch, potato flour, enrobed in oil or treated with a starch or calcium solution.

Finishing Par-fries

The par- fries of the present invention can be finished by several methods. The par-fries can be baked in various types of ovens, including a forced air convection oven, hot air impingement oven, double impingement oven, infrared oven, a combination of infrared radiation and convection oven, a toaster, a toaster oven, a microwave oven, a combination microwave and forced air convection oven, or a conventional home oven.

The par-fries of the present invention can be finished in less than about 3.0 minutes. Preferably, the par-fries can be finished in about 0.50 minute to about 2.5 minutes, more preferably in about 0.60 minute to about 2.0 minutes, even more preferably in about 0.70 minute to about 1.5 minutes, and most preferably in about 0.75 to about 1.25 minutes in a forced air convection oven, double impingement oven and/or microwave oven. The temperature for finishing the par-fries in a forced air convection oven and/or double impingement oven is in the range of from about 350° F. (177° C.) to about 500° F. (260° C.), preferably from about 375° F. (191° C.) to about 475° F. (246° C.).

When conventional home ovens are used to finish the par-fries of the present invention, the par-fries can be finished in about 3.0 to about 15 minutes, preferably in about 4.0 to about 12 minutes, more preferably in about 5.0 to about 10 minutes, and most preferably in about 6.0 to about 8.0 minutes at oven temperatures of from about 350° F. (177° C.) to about 500° F. (260° C.), preferably from about 375° F. (191° C.) to about 475° F. (246° C.), more preferably from about 400° F. (204° C.) to about 450° F. (232° C.).

The time and temperature for finishing the par fried potato strips of the present invention will vary depending upon the quantity of strips, their initial temperature, the type of oven and the oven conditions, and the thermal properties of the par-fries. Of particular importance are the thermal conductivity of the low-moisture crust region, the thermal conductivity of the high-moisture interior starch-matrix core, and the surface heat transfer coefficient of the par-fry. In general, higher thermal conductivities and higher surface heat transfer coefficients will result in more rapid transfer of heat from the oven to and through the fry, resulting in reduced cooking time. Since it is an object of the present invention to provide a fast food process for quickly finishing frozen par-fries in an oven, these properties are of particular importance. The desirable thermal conductivities at oven temperature of the low moisture crust region in the par-fry are from about 0.1 to about 0.3 watt/m-° C. The desirable thermal conductivities at oven temperature of the high moisture core region in the par- fry are from about 0.4 to about 0.7 watts/m-° C. The thermal conductivity of the crust region can be adjusted to the desirable range by controlling the level of moisture and fat in the crust.

The surface heat transfer coefficient of the par fry is a function of air velocity, air temperature, and the nature of the oil film at the surface of the par fry. Higher surface heat transfer coefficients are desirable since this will generally lead to faster cooking time, and the formation of more distinct and crisp low moisture crust region in the oven-finished French fry. The desirable surface heat transfer coefficients at oven temperature of the prebake fry in the oven are from about 50 to about 400 watts/m$^2$-° C. The surface heat transfer coefficient is increased as a consequence of enrobing the parfried potato strips with an edible fat or oil which increases the conduction of heat from the surrounding air to the fry surface. The surface of the prebake fry may also be modified to improve the absorption of radiant heat from the oven. A typical method of accomplishing this would be to alter the color, porosity, and or reflectivity of the surface. Increasing the velocity of the oven air at the surface of the par-fr) will also increase the surface heat transfer coefficient. The oven air velocity should be high enough to achieve a satisfactory heat transfer coefficient, but not so high as to strip away any of the surface modifying agent previously described.

ANALYTICAL PROCEDURES

The methods for detennining the 1) moisture content, 2) the level of 2,5-dimethyl pyrazine 3) the level of 2,4-decadienal and 4) gram of fat/gram of potato solids of par-fries of the present invention are set forth below:

Determination of Bulk Moisture Content

Moisture content is determined by a forced air oven method as follows:
1. Uniformly grind up a representative sample of potato strips in a blender or conventional food processor.
2. Accurately weigh approximately 5 grams of ground sample (weight "A") into a previously tarred metal pan or dish.
3. Place the metal dish containing the sample in a forced air convection oven at 105° C. for 2 hours.
4. After 2 hours, remove the metal dish containing the dried sample and allow to cool to room temperature in a desiccator over a desiccant such as anhydrous calcium sulfate.
5. Re-weigh the dish containing the dried sample and calculate the weight of the dried sample (weight "B") by subtracting the dish tare weight.
6. Calculate the percent moisture of the sample as follows:
   % Moisture=[(A−B)/(A)]×100

Determination of Total Fat Content

Total fat content is determined by a solvent extraction method as follows:

Apparatus
1. Soxtec HT6 extraction system; unit includes heating block and cooling condenser.
2. Recirculating water bath for cooling condenser.
3. Recirculating oil bath for heating block.
4. Extraction beakers.
5. Extraction thimbles, 26 mm (Fisher TC 1522-0018)
6. Nitrogen purging gas
7. Vacuum drying oven
8. Analytical balance (4 place)
9. Dispensing pipette (50 ml)

Materials
1. Methylene chloride (Balcer 9315–33)
2. Boiling stones (Chemware PTFE Fisher 09–191–20)
3. Silicone oil (Fisher TC1000–2779)
4. Glass wool (Fisher 11–390)

Procedure
1. Uniformly grind a representative sample of potato strips in a blender or conventional food processor.

2. Accurately weigh (to four places) a piece of glass wool (sufficient in size to contain sample pieces in the thimble) and the extraction thimble; record weight of thimble+glass wool (weight "A").
3. Load the ground sample into the thimble and cap the loaded thimble with the pre-weighed piece of glass wool.
4. Accurately weigh (to four places) and record the weight of the ground sample, thimble, +glass wool (weight "B").
5. Place two or more boiling stones into an extraction beaker and weigh (to four places); record weight of extraction beaker+boiling stones (weight "C").
6. Place loaded thimbles on the extraction unit and raise the thimbles to rinse position.
7. Pipette 50 ml of methylene chloride into each pre-weighed extraction beaker with boiling stones.
8. Set oil heating bath to 110° C. and water cooling bath to 28.3° C. and allow temperatures to equilibrate.
9. Lower the loaded thimbles into the extraction beaker containing the solvent and allow to boil in the solvent for 60 minutes with the condenser's pet cock in the open position.
10. Raise the thimbles to the rinsing position and rinse for 60 minutes.
11. Turn the condenser's pet cock to the closed position and allow the solvent to evaporate for 60 minutes. Turn the nitrogen purging gas on to aid the evaporation.
12. Transfer the beaker to a vacuum oven, pre-warmed to 120° C., for 30 minutes at full vacuum.
13. Allow the beaker to cool to room temperature and weigh (to four places); record the weight of the beaker+boiling stones+extracted fat (weight "D").
14. Calculate percent total fat as follows:

% Fat=[(D−C)/(B−A)]×100

Accordingly, the disclosed embodiments are considered in all respects to be illustrative and not restrictive. The scope of the invention is indicated by the appended claims.

SIMULTANEOUS DISTILLATION, EXTRACTION AND GC ANALYSIS FOR VOLATILE COMPOUNDS IN FRENCH FRIES

References (1) Schultz, T. H., Fath, R. A., Mon, T. R., Eggling, S. B., and Teranishi, R. "Isolation of Volatile Compounds" *J. Agric. Food Chem.*, Vol. 25, No. 3, May–June (1977) pp. 446–449.

(2) Likens, S. T., Nickerson, G. B. *Proc. Am. Soc. Brew. Chem.* 5 (1964)

Scope

This procedure has been applied to recovering volatiles (e.g., 2,5- dimethyl pyrazine and 2,4- decadienal) from French fries. This procedure is applicable to other food components and finished products as long as the desired analyte is steam distillable.(1) (2)

Principle

As the sample is steam distilled at atmospheric pressure the steam distillate and methylene chloride vapors are co-mingled then co-condensed. After liquid phase separation occurs in the extractor u-tube, the lighter aqueous phase returns to the sample flask and the heavier methylene chloride phase returns to the analyte concentration flask. When distillation/extraction is complete the methylene chloride is gently blown down and a portion of this concentrate is analyzed further by capillary GC/FID. An internal standard is added to the sample at the onset of the method to track analyte recovery.

Accuracy and Precision

The areas of the internal standard peak Tetramethylpyrazine (TMP) were looked at for eleven samples over a 20 day period. Areas, averages, standard deviation and recovery data follows:

| Sample | Date | Area |
|---|---|---|
| WDV 2227 | 2/20/97 | 356988 |
| 2228 | 2/25/97 | 310625 |
| 2229 | 2/25/97 | 431832 |
| 2230 | 2/26/97 | 322811 |
| 2231 | 2/26/97 | 322811 |
| WKJ 547 | 3/04/97 | 421138 |
| 548 | 3/05/97 | 418766 |
| 549 | 3/06/97 | 466864 |
| 550 | 3/06/97 | 432748 |
| WHS 110-101-1 | 3/11/97 | 321636 |
| WHS 110-101-2 | 3/11/97 | 453519 |
| ave: 385262 | std. dev.: 62911 | % rsd: 16.3 |

Equipment

| | |
|---|---|
| Gas Chromatograph | Hewlett Packard 5890 equipped with Flame ionization detector (FID) and 3396 integrator |
| Autosampler (optional) | Hewlett Packard 7673A |
| Capillary Column | Stabilwax 30m, 0.32 mm ID, 0.25 umdf |
| Autosampler Vials (with inserts) | Kimble EKONICAL 60745-1232 (Kimble 60820-1232 with 66009-996 inserts) |
| Balance | Top loading, two place, four place |
| Support Jacks (2) | VWR 60142-546 |
| Hot plate/stirrer (3) | Corning 6795-220 |
| Circulating Bath/cooler | Lauda RM3 |
| 250 mL Flat Bottom Round Flask | Pyrex 4100-250 |
| 2000 mL Flat Bottom Round Flask | Kontes 601000-0829 |
| Reducing Adapter 24/40-29/42 | Pyrex 8825-2924 |
| Size 24 Stopper | Kimble 4189OR-2440 |
| 50 mL, 100 mL and 1000 mL Graduated Cylinder | Pyrex 24710-102, 124 Kimax 34795-062 |
| 1 mL Reacti Vial | Accuform Kimble 60700-1 |
| Scintillation Vials | VWR 66022-081 |
| Pasteur Pipets | VWR 14672-200 |
| Syringe (2) | Hamilton 100 ul |
| Volumetrics | Kimax 28014-100 |
| SDE Glassware | Kontes 523010-0000, 52301, 523012 |
| Boiling Stones | VWR 26397-409 |
| Stir Bar 76.2 × 12.7 mm | VWR 58948-193 |
| Support Base | VWR 60110-266 |
| 3 Prong Clamp | VWR 21570-404 |
| Pie Plate (2) | |

*Equivalent equipment may be substituted for that recommended above

Reagents

Solvent Usaae and Disposal: Solvents, such as methylene chloride and acetone should be used in a hood while wearing eye and skin protection.

| | |
|---|---|
| Tetramethylpyrazine (TMP) | Aldrich 18, 393-8 |
| Methylene Chloride | B&J 300-4 |
| Acetone | B&J 010-4 |
| Antifreeze | |
| Deionized water | Milli-Q |
| Dry Ice Pellets | |
| N2 | |

Operation

A. Internal Standard(s) Preparation

1. Tetramethylpyrazine (TMP)

Weigh 0.10 g±0.001 TMP into a 100 mL volumetric flask. Add fresh deionized distilled water to volume. Label flask. Add 50 ul of this standard to the 2000 ml sample flask when performing extraction.

B. Distillation and Extraction Procedure
1. Circulation bath/cooler
   a. Place coolant (1:1 antifreeze:H$_2$O) in cooler chamber. Fill to above cooling coil.
   b. Set cooling dial to 0 C.
2. Distillation and Extraction
   a. Place SDE condenser insert into main chamber making sure inlet glass tube is to the right. Shut stopcock at the bottom of apparatus.
   b. Place SDE apparatus into three prong clamp. Connect tubing to that cooler. Turn on cooler.
   c. Place dry ice and approx. one inch of acetone into top condenser piece. Place top condenser piece onto assembly (may have to add dry ice throughout extraction.)
   d. Place 100 mL Methylene Chloride (measured from a 100 mL graduated cylinder) and one boiling stone into the 250 mL flat bottom round flask. Join flask to right side of condenser. Place pie pan on hot plate on support jack. Add approx. I liter distilled H$_2$O to pie plate and adjust support jack upwards until flask is secure to apparatus. Turn hot plate to heat setting "4" (60° C.).
   e. Place stir bar and 700 mL of fresh, deionized distilled water into the 2000 mL flask. Add sample to be extracted according to the following table:

| Sample type | Weight |
| --- | --- |
| fries | 50.0 ± 0.1 g |

Add 50 ul of 0.1% TMP internal standard to flask.
   f. When enough MeCl$_2$ has boiled to fill loop of condenser, attach the large flask to left side of condenser using the 24/40–29/42 reducer. Raise 2nd hot plate on jack until flask is secure. Turn hot plate heat setting to above "6" (a setting adequate to generate rapid boiling without foaming) then turn the stir setting to full.
   g. Place insulating sleeve on left arm of condenser and paper towel around stopcock (if needed to catch condensation).
   h. Allow sample flask to come to a boil (approx. 20 minutes from starting to heat.) Time the extraction/distillation for 90 minutes.
   i. After 90 minutes turn off the heat on both hot plates. Lower right hot plate with water pan, rest bottom of flask on edge of pan. Allow condensation to stop and MeCl$_2$ flask to cool (approx. 15 minutes).
   j. When MeCl$_2$ has cooled, remove the 250 mL flask from right side and add the MeCl$_2$ still in loop of condenser to the flask via the stopcock. Place glass stopper in 250 mL flask and store in explosion-proof freezer until ready to concentrate (Section 3).
   k. Using hot mitts (caution, sample flask will still be hot) lower and remove 2000 mL flask.
   l. Turn off cooler. Disconnect top (inlet) hose and allow as much coolant to drain back into cooling chamber as possible. Carefully disconnect bottom (outlet) hose. Drain any remaining coolant into cooling chamber.
   m. Set condenser pieces aside to wash (section 4).
3. Sample Extract Concentration
Extract may be stored either before step "a" or after step "d" in explosion-proof freezer indefinitely. If storing extract after step "h", MeCl$_2$ may evaporate and volume may need to be adjusted before further analysis
   a. Set up the third hot plate with second pie pan containing distilled H$_2$O in fume hood equipped with N$_2$ line.
   b. Heat water in pan on setting "3" (60° C.).
   c. Place 250 mL sample flask (Section 2,j) into water and concentrate MeCl$_2$ to 40 mL under gentle stream N$_2$.
   d. Transfer 20 ml of concentrate to a 20 ml scintillation vial and place vial in hot water bath on hot plate and concentrate the MeCl$_2$ under N$_2$ until approx. 2 ml remain. Hold or clamp vial so it does not float or become contaminated by H$_2$O during concentration.
   e. Remove scintillation vial from H$_2$O and replace with a 1 ml Reacti vial. Add 1 ml of concentrate from step (d) to reacti vial using a Pasteur pipette. Transfer MeCl$_2$ carefully, it will drip from pipette tip.
   f. As MeCl$_2$ blows down, continue to add sample concentrate until all has been transferred from scintillation vial. Rinse scintillation vial with appox. 1 mL of fresh MeCl$_2$ and transfer this rinse to reacti vial.
   g. Continue to concentrate MeCl$_2$/until 100 ul remains. Take extreme care to not allow the extract to evaporate to dryness. Transfer the 100 ul (via a syringe to a GC vial (with insert). Cap GC Vial.
4. Glassware Clean-up
General Hazards: Use acetone in fume hood. Wear gloves and eye protection.
   a. Soap and rinse distillation apparatus, flasks, condenser, graduated cylinders and reacti vials.
   b. Rinse all glassware with distilled H$_2$O.
   c. Rinse all glassware with acetone. Also rinse with acetone and vacuum the syringe used to transfer extract to GC vial.
   d. Dry all glassware with N2 to remove acetone.

C. GC Analysis
1. Set up Instrument conditions as per Table I and integrator and sequence as per Table II.
2. To light FID detector open H2 and compressed air at tanks. Open valves on GC, detector 2. Press FID button, listen for "pop". Open auxiliary gas valve.
3. Fill two large vials (for syringe rinse on auto sampler) and one GC vial with MeCl$_2$.
4. The first run each day is a MeCl$_2$ wash. Place MeCl$_2$ containing GC vial in position "1" on autosampler. To start run, press:

SHIFT  SEQ  START
    CHT SP on 3396 integrator. After method has loaded can change rate to 10/min for MeCl$_2$ only.
5. To analyze sample replace MeCl$_{12}$ vial with the vial prepared in step "g" of sample extract concentration. Advance integrator to clean sheet of paper by holding the SHIFT and ENTER keys down together. Type sample ID and hit BREAK key at end of line to return printer carriage. To start run press:

SHIFT  SEQ  START
    CHT SP

6. If using inserts in vials and no solvent peak appears on run; hit ABORT to stop run, re-center insert ad replace vial seal and perform step "5" again.

7. After last GC analysis allow oven to cool to 40C. Turn off aux gas. H$_2$ and air valves on instrument and turn H$_2$ and air gauges on tanks to closed.

D. Calculation Method

To calculate the amount (ppm) of analyte per sample, use the following calculation:

$$\frac{\text{Area of Analyte}}{\text{Area of Internal Std.}} \times \frac{\text{weight of Internal Standard (g)}}{\text{weight of sample (g)}} \times \frac{1 \text{ ppm}}{10^{-6}} =$$

ppm Analyte

EXAMPLE $$\frac{503191 \text{ area units analyte}}{1667783 \text{ area units ISTD}} \times \frac{(5 \times 10^{-5})g}{50 \text{ g}} \times \frac{1 \text{ ppm}}{10^{-6}} = 0.30 \text{ ppm analyte}$$

TABLE I

GC Parameters
Run parameters:
Zero=0
Attn 2=2
Cht sp=1.0
Ar Rej=0
Thrsh=1
Pk Wd=0.04
Oven Temp 40
Equib time=1
Oven Max=260
Initial temp=40
Initial time=0
Temp prgm:
rate=4.0 Final temp=250 Final time=20.0
Inj temp=250
Det temp=325
Signal 2 =B
Range=0
Zero 15.1
Atten=2
Detect B=FID (ON)
Purge B=OFF
On time=0.5 Off time=0.0

TABLE 2

Sequence Parameters:
inet sampler control=yes
quil time=0
method=m:above method.
injector:
 # of pumps 4
viscosity=7
volume=1
# of solvent washes=6

Example 1

Frozen commercial shoestring-cut par-fried potato strips are an acceptable starting product (e.g., Simplot Par-Fries; J. R. Simplot Co., Caldwell, ID). A typical processing history may include: sorted and graded Russet Burbank potatoes are peeled, washed, trimmed and cut axially into shoestring strips (0.28 inch square cross-section). The potato strips are blanched in hot water or steam and partially dried with hot air such that the potato strips are reduced in weight by about 15%. The partially dried strips are then par-fried in partially-hydrogenated soybean oil (Iodine Value of about 67) for about 50 seconds at an oil temperature of about 375° F. (190.5° C.). The par-fried potato strips are then cooled and frozen in a blast freezer at −30° F. (−34.4° C.) and packaged. The par-fried potato strips have a moisture content of about 64% and a fat content of about 6%.

About 1.5 lb. of the packaged frozen par-fried potato strips are further processed by frying a second time in a 50 lb. oil capacity foodservice frying kettle containing Primex 108 vegetable oil (blend of partially hydrogenated soybean oil and corn oil available from the Procter & Gamble Co.) for about 3 minutes and 45 seconds at a temperature of about 290° F. (143.3° C.). The resulting par-fries are immediately frozen by spreading the par-fries in a monolayer in a −40° F. freezer for 20 minutes. The par-fries are then packaged in foil laminate bags and stored at normal freezer temperatures of approximately 0° F. (−17.8° C.). The resulting par-fries have about 45% moisture, about 13% fat, about 0.2 ppm 2,5-dimethyl pyrazine, and about 2.6 ppm 2,4-decadienal.

Example 2

Frozen commercial shoestring-cut par-fried potato strips are an acceptable starting product (e.g., Simplot Par-Fries; J. R. Simplot Co., Caldwell, ID). A typical processing history may include: sorted and graded Russet Burbank potatoes are peeled, washed, trimmed and cut axially into shoestring strips (0.28 inch square cross-section). The potato strips are blanched in hot water or steam and partially dried with hot air such that the potato strips are reduced in weight by about 15%. The partially dried strips are then par-fried in partially-hydrogenated soybean oil (Iodine Value of about 67) for about 50 seconds at an oil temperature of about 375° F. (190.5° C.). The par-fried potato strips are then cooled and frozen in a blast freezer at −30° F. (−34.4° C.) and packaged. The par-fried potato strips have a moisture content of about 64% and a fat content of about 6%.

About 1.5 lb. of the packaged frozen par-fried potato strips are further processed by multiple immersion frying in a 50 lb. oil capacity foodservice frying kettle containing Primex 108 vegetable oil (blend of partially hydrogenated soybean oil and corn oil available from the Procter & Gamble Co.) at about 290° F.

The par-fries are immersed in the frying oil for 1 minute and 30 seconds, then removed from the oil for 1 minute, re-immersed for 1 minute and 30 seconds, removed from the oil for 1 minute, and finally immersed in the oil again for 1 minute. The resulting par-fries are immediately frozen by spreading the par-fries in a moniolayer in a −40° F. freezer for 20 minutes. The par-fries are then packaged in foil laminate bags and stored at approximately 0° F. (−17.8° C.). The resulting par-fries have about 39% moisture, about 19% fat, about 0.45 gram fat/gram of potato solid, about 0.3 ppm 2,5-dimethyl pyrazine, and about 5 ppm 2,4-decadienal.

What is claimed is:

1. Par-fried potato strips comprising:

(a) from about 32% to about 52% moisture;

(b) less than about 0.6 ppm 2,5-dimethyl pyrazinel and (c) a non-digestible fat.

2. The par-fries of claim 1 wherein the par-fries comprise less than about 0.50 ppm 2,5 dimethyl pyrazine.

3. The par-fries of claim 2 wherein the par-fries comprise less than about 0.40 ppm 2,5 dimethyl pyrazine.

4. Par-fried potato strips of claim 1 further comprising a coating.

5. The par-fried potato strips of claim 4 wherein the coating comprises starch.

6. The par-fries of claim 1 wherein the par-fries comprise less than about 0.3 ppm 2,5-dimethyl pyrazine.

7. The par-fried potato strips of claim 1 wherein the potato strips are a shoestring-cut.

8. Par-fries comprising:
   (a) at least about 0.50 ppm 2,4-decadienal;
   (b) from about 32% to about 52% moisture;
   (c) less than about 0.6 ppm 2,5-dimethyl pyrazine; and
   (d) fat selected from a triglyceride or a non-digestible fat.

9. The par-fries of claim 8 wherein the par-fries comprise at least about 0.60 ppm 2,4-decadienal.

10. The par-fries of claim 9 wherein the par-fries comprise at least about 0.80 ppm 2,4-decadienal.

11. The par-fries of claim 10 wherein the par-fries comprise at least about 1.0 ppm 2,4-decadienal.

12. The par-fries of claim 8 wherein the par-fries further comprise greater than about 0.35 gram of fat/gram potato solids.

13. The par-fries of claim 12 wherein the par-fries comprise at least about 1.0 ppm 2,4-decadienal and from about 0.35 to about 0.45 gram of fat/gram potato solids.

14. The par-fries of claim 8 wherein the potato strips are a shoestring-cut.

15. Par-fried potato strips of claim 8 further comprising a coating.

16. The par-fried potato strips of claim 15 wherein the coating comprises starch.

17. A process for preparing par-fried potato strips comprising from about 32% to about 52% moisture and less than about 0.6 ppm 2,5-dimethyl pyrazine, greater than about 0.50 ppm 2,4- decadienal, comprising the steps of:
   (a) par-frying potato strips in oil at a temperature of about 270° F. to about 335° F. for a time sufficient to reduce the moisture of the potato strips to a moisture content of about 32% to about 52%; and
   (b) freezing the partially fried potato strips.

18. The process of claim 17 wherein the potato strips are fried in oil at a temperature of about 290° F. to about 310° F. to a moisture of about 32% to about 52%.

19. A process for preparing par-fried potato strips comprising from about 32% to about 52% moisture and less than about 0.6 ppm 2,5-dimethyl pyrazine, comprising the steps of:
   (a) par-frying potato strips in a vacuum fryer at a temperature of about 250° F. to about 400° F. under a pressure less than about 200 mmHg for a time sufficient to reduce the moisture of the potato strips to a moisture content of about 32% to about 52%; and
   (b) freezing the partially fried potato strips.

20. A process for preparing par-fried potato strips comprising from about 32% moisture to about 52% moisture and less than about 0.6 ppm 2,5-dimethyl pyrazine, comprising the steps of:
   (a) par-frying potato strips in oil at a temperature of about 250° F. to about 400° F. under a pressure of less than about 400 mm Hg for a time sufficient to reduce the moisture of the potato strip to a moisture content of about 32% to about 52%; and
   (b) freezing the par-fried potato strips.

21. The process of claim 20 wherein the oil comprises a non-digestible fat.

22. A process for preparing par-fried potato strips comprising from about 32% moisture to about 52% moisture and less than about 0.6 ppm 2,5-dimethylpyrazine from potato strips having a low level of reducing sugars, comprising the steps of:
   (a) immersing blanched potato strips in water for a time sufficient to lower the level of reducing sugars in the blanched potato strips;
   (b) par-frying the blanched potato strips a first time in oil at a temperature of about 300° F. to about 390° F. to a moisture content of no lower than about 54% to produce par-fries;
   (c) freezing or chilling the par-fries; and
   (d) par-frying the par-fries of (c) a second time in oil at a temperature of 270° F. to about 335° F.

23. The process of claim 22 wherein the blanched potato strips of (a) are coated with a solution comprising starch prior to par-frying.

24. The process of claim 23 wherein the par-fries are frozen after step (d).

25. The process of claim 23 wherein the oil comprises a non-digestible fat.

* * * * *

UNITED STATES PATENT AND TRADEMARK OFFICE
CERTIFICATE OF CORRECTION

PATENT NO. : 6,001,411
DATED : December 14, 1999
INVENTOR(S) : Jeffrey John Kester, et al.

It is certified that error appears in the above-identified patent and that said Letters Patent is hereby corrected as shown below:

On title page, item [75] inventors. Add: Timothy A. Scavone, Loveland Oh

Signed and Sealed this

Sixth Day of February, 2001

Attest:

Q. TODD DICKINSON

Attesting Officer

Director of Patents and Trademarks